Patented Dec. 30, 1952

2,623,832

UNITED STATES PATENT OFFICE 2,623,832

POLYMERIZING SILICON ACYLATES

Charles A. MacKenzie, New Orleans, La., and Milton Schoffman, Brooklyn, N. Y., assignors, by direct and mesne assignments of one-half to Montclair Research Corporation, a corporation of New Jersey, and one-half to Ellis-Foster Company, a corporation of New Jersey No Drawing. Application September 20, 1946, Serial No. 698,409

14 Claims. (Cl. 106—287)

This invention relates to the production of silicones and particularly their production from silicon acylates, to methods of producing such products, to the products obtained, and to the utilization of the products.

Among the objects of the present invention is the production of silicones by relatively inexpensive and simple methods yielding silicones of utility in the arts.

Other objects include methods of utilizing such silicones and other products obtained in the production of silicones from silicon acylates.

Still further objects include products treated by or with such silicones.

Still further objects and advantages of the present invention will appear from the more detailed description set forth below, it being understood that such more detailed description is given by way of illustration and explanation only, and not by way of limitation, since various changes therein may be made by those skilled in the art, without departing from the scope and spirit of the present invention.

In accordance with the present invention a silicon acylate is utilized in the production of a silicone by any of a variety of treatments which result in unique products having utilities of great value in the art. The methods utilized may fall generally into three classes: (a) condensation through decomposition of the acyl group as by heat; (b) copolymerization, i. e., with silicon tetrachloride; and (c) solvolysis by such reagents as water, anhydrous alcohol, and anhydrous ammonia.

The silicon acylates employed in accordance with the present invention may be generically formulated as $R_a R'_b R''_c SiAc_{(4-a-b-c)}$, where R and R' are organic groups particularly aliphatic including alkyl and alkenyl or carbocyclic such as aryl, R'' is hydrogen or an organic group particularly aliphatic including alkyl and alkenyl or carbocyclic such as aryl, Ac is a fatty acid acyl group, $a$ is from 1 to 3, $b$ is from 0 to 1, $c$ is from 0 to 1, and $a+b+c$ is equal to or less than 3. R, R' and R'' may be the same or different groups. The term arkyl is used herein to cover alkyl, alkenyl and aryl groups. In those acylates where the compounds are derived from silanes and there is one hydrogen attached to silicon, the acylates may be formulated generically as $R_a R'_b SiHAc_{(4-a-b)}$, where R, R' and Ac have the values set forth above, and $a$ is from 1 to 2, $b$ is from 0 to 1, and $a+b$ is not greater than 2. In those cases where no hydrogen is attached to silicon, the acylates may be generically formulated as $R_a R'_b R''_c SiAc_{(4-a-b-c)}$, where R, R', R'' and Ac have the values set forth above except that R'' is not hydrogen, and $a$ is from 1 to 3, $b$ is from 0 to 1, $c$ is from 0 to 1, and $a+b+c$ is not greater than 3. As exemplary of acylates that may be utilized in accordance with the present invention and illustrating the formulated acylates as given above, there may be particularly mentioned ethyl triacetoxy silane, n-propyl triacetoxy silane, butyl triacetoxy silane, allyl triacetoxy silane, hexyl triacetoxy silane, phenyl triacetoxy silane, ethyl tripropionoxy silane, dimethyl diacetoxy silane, di-n-butyl diacetoxy silane, diethyl diacetoxy silane, diethyl dipropionoxy silane, butyl diacetoxy silane, butyl dipropionoxy silane, etc. The acyl group present in such compounds is particularly the acyl group from a carboxylic fatty acid as illustrated above.

Such silicon acylates may be treated with a silicone forming agent which converts the acylate into a silicone with or without heat depending on the conditions under which the operation is carried out, and heat alone may be utilized to convert the acylates into silicones without utilizing necessarily a silicone forming agent. Thus for such conversions, various methods may be utilized including heat alone, particularly at temperatures of from 150 to 250° C. or other elevated temperatures with or without pressure, the temperature and pressure depending in part on the nature of the material being treated and the extent of the conversion desired, while exemplary of silicone forming agents that may be utilized to treat the acylates to form silicones include alcohols such as anhydrous ethyl alcohol, silicon halides such as silicon tetrachloride, anhydrous ammonia and which may or may not be utilized under the conditions which permit temperature rises to elevated temperatures to take place, or while cooling, and may be employed in the presence of solvents such as ether, benzene, etc., and also water which of itself may be utilized in the production of silicones and derivatives of silicones from the stated acylates.

Considering the methods where the acylates are heated at elevated temperatures under preferably atmospheric pressure, decomposition of the acylate takes place with polymerization of the silicon derivative to produce a polymeric siloxane or silicone. The degree of polymerization depends on the number of acylate groups present originally and the number of groups split out. And the reaction may be controlled with respect to such polymerization and the groups split out. As indicated above, temperatures generally employed should be elevated and high enough to produce the reaction desired, and in general at atmospheric pressure, temperatures of from 150 to 250° C. may be employed.

When alcohols are utilized, the acylate may be heated with an alcohol such as ethyl alcohol to produce a silicone with the elimination of an ester. In such reactions utilizing an alcohol such as butyl alcohol, for example, a butyl ester is formed or other corresponding ester with the alcohol and the acyl group split out from the acylate so that the reaction and method may be utilized in the preparation of esters. Where esters such as butyl acetate are produced, for example, such esters have value as solvents for resin applications and may, therefore, be permitted to remain with the silicon derivative, a composition containing the silicon derivative and solvent being simultaneously produced by such methods.

Where a silicon halide such as silicon tetrachloride is employed in the production of the silicone, additional silicon is thus introduced into the product via the silicon halide such as silicon tetrachloride employed and the acyl group which is removed is probably for the most part in the form of an acyl halide. Such reaction of the acylate with silicon halide such as silicon tetrachloride is desirably carried out at elevated temperatures, as for example, water bath temperatures of about 100° C. but other temperatures may be employed. The length of heat treatment will depend again on the number of groups which it is wished to split out and the character of product as to viscosity and other properties desired. Ordinarily from at least 2 hours heating may be required. The heating may take place under separate temperature treatments where the material is first heated at one temperature and then subsequently heated for a period of time at a higher temperature, particularly under reduced pressure.

In the conversion of the acylates to silicones by treatment with ammonia, particularly anhydrous ammonia, the ammonia may be contacted with the acylate in any desired way, as by bubbling it into the acylate or a solution of the acylate. The formation of acid amide may take place immediately and unless a solvent for the amide is present, the latter will be precipitated. The reaction is frequently exothermic and the temperature will build up unless cooling is employed. The reaction may be carried out in the presence of solvents such as ether, benzene, etc. with or without cooling. Acyl groups are removed in the formation of the acid amide and with the production of a silicone usually by condensation from the silanol first formed. Such processes may be utilized in the production of amides. The reaction may be readily carried out in the presence of isopropyl ether and with a solvent of this type the isolation of the silicon product is simplified since it remains in solution while the amide precipitates. Benzene also works in an analogous way. In general an inert solvent is used in which the amide is insoluble and the silicone is soluble. In lieu of ammonia, amines may be employed, as for example, aniline works satisfactorily giving acetanilide as one product and the silicone as the other.

The effect of water on the acylates is important in the production of silicones and derivatives from such acylates. In carrying out such reactions, the acylates may be treated with water under any desired conditions, frequently mere shaking of the acylate with water being sufficient to give the desired reaction. In some cases heat may be employed or steam may be introduced but ordinarily the use of water at ordinary temperatures is sufficient with agitation. The results obtained in many instances depend on the relative amount of water which is employed. In amounts of water to acylate of less than about 5:1 the silicone is generally produced in the form of a precipitated material, whereas with amounts of water by volume of more than 5 to 1, as for example, up to 10 to 1, the hydrolyzed material is generally produced in the form of a colloidal solution or sol. It should be noted that such silicon containing sols thus produced while having many properties analogous to silica sols produced in the usual way from inorganic derivatives, exhibit properties different from such sols produced from inorganic materials, as for example, no inorganic ions are present. The production of sols in this way is particularly important as it enables treating solutions or materials to be produced of great value as will be further pointed out below. With the higher acylates in general, the silicon containing sols do not form. Acylates, for example, of ethyl hexanoic acid and higher derivatives frequently do not produce sols under the conditions stated. Acids formed during the hydrolysis of the acylate tend to stabilize or produce rapid hydrolysis and the production of such colloidal solutions. There is a difference in behavior of the silicon acylates which contain an organic substituent such as alkyl or aryl attached to silicon as compared with the tetra acylates. With silicon tetra acylates, hydrolysis is usually rapid and a clear colloidal solution results. The colloidal silicon containing material may be deposited from the water solution by evaporation of the acid solution. For example, a piece of cloth or other material may be dipped into the solution, and on drying the sample, silica is deposited. Or ammonia may be used to cause immediate precipitation and an article treated as set forth above may be exposed to ammonia fumes to bring about an immediate deposit of silica. In such cases the ammonia also serves to neutralize any organic acid present.

The substituted silicon acylates such as, for example, butyl triacetoxy silane, do not behave in the same manner as the tetra acylates. When mixed with water, part of the material becomes colloidally dissolved or dispersed while a second portion becomes dispersed as very fine droplets that cause the liquid to appear cloudy. If the concentration is kept at 5% or below as a general rule, a fairly clear solution may be obtained. The solutions produced are useful, however, even though these undissolved droplets form. The mixtures may be utilized in the manner set forth above for the hydrolyzed silicon tetra acylates and in other ways as explained below. There is also a difference in stability between the two types of hydrolyzed products. The tetra acylates may be hydrolyzed and allowed to set for a few hours or even a few days if the concentration is kept generally at not over 10% silicon acylate. (It may be noted, however, that solutions having amounts of hydrolyzed product derived from 1 to 20% by weight of the silicon acylates may be employed.) With the substituted silicon acylates, the dispersion is generally desirably used prompty after being produced since there is a tendency for the fine droplets to coalesce. Further, a hydrolyzed tetra acylate tends to turn to a gel on standing, whereas the substituted acylates tend to settle out as oily silicones.

The silicones from the sols or other hydrolyzed products produced by treatment of the acylates by water may be precipitated by the addition of ammonium hydroxide or by evaporation of part of the water in which it is dispersed. They may also be obtained from the dispersion by extraction with a water immiscible organic solvent like benzene.

Sometimes a better dispersion of the substituted acylates may be obtained by first mixing them with a water-soluble organic solvent like acetone, alcohol, etc. before carrying out the hydrolysis. A solvent in an equal volume to that of the acylate may be employed for this purpose.

The silicones, their solutions, dispersions, and other products produced in accordance with the present invention have a wide variety of utilities. They may be employed in the treatment of textiles or fabrics, as for example, by utilizing the silicone containing material obtained directly from the treatment of the acylates, and particularly in the form of the water solutions, dispersions or suspensions, in which solutions a piece of cloth or other textile, paper, etc. may be dipped and then dried to produce a deposit of silicone.

The solutions of such silicones or hydrolyzed materials derived from the acylates in organic solvents, or in water solutions when water-soluble, or dispersions or suspensions, may be used as lacquers or coating compositions, as adhesives, etc., either alone or in admixture with other completely reacted or potentially reactive resins. Such resins include natural resins such as rosin, copal, shellac, etc., as well as synthetic resins including urea aldehyde resins, phenol aldehyde resins, melamine resins, aniline aldehyde resins, acetone formaldehyde resins, alkyd resins, cumarone resins, polymerized vinyl derivatives and vinyl resins, polymerized acrylic derivatives including the esters of acrylic and methacrylic acids, other resinous silicon containing organic materials, etc.

They may be utilized as textile finishing compositions either alone or in solution in solvents to produce special effects such as waterproofing, creaseproofing, wrinkleproofing, etc.

They may be utilized either alone or in admixture with other additives including resins as set forth above and with or without inorganic or organic fillers in the production of compositions for hot molding, extruding, casting, etc. Objects having excellent strength and highly resistant to water and organic solvents may thus be produced. The inorganic fillers include both fibrous and non-fibrous materials such as the clays like bentonite, mica, asbestos, glass, cellulosic fibers and materials such as paper, cotton, wood flour, etc.

The silicon derivatives prepared in accordance with the present invention may be used as lubricating oils or may be used as additives in lubricating oils such as hydrocarbon oils and also for inclusion with vegetable oils, particularly the drying oils such as linseed oil, and China-wood oil, the semi-drying oils such as soya bean oil, as well as non-drying oils such as castor oil, etc. The silicon derivatives may be blended or cooked with the vegetable oils in producing such compositions.

The silicon derivatives of the present invention may be utilized in view of their excellent electrical properties as varnishes, etc. in producing coatings or articles or coated articles for electrical insulation and so on. These silicon derivatives may also be used in the production of laminated products for bonding together two or more sheets of the same or different organic or inorganic materials.

In the first example a silicone is formed by the action of heat on butyl silicon triacetate.

*Example 1.*—In a 3-neck flask, equipped with a stirrer, thermometer and condenser set for distillation, was placed 20 parts by weight of butyl silicon triacetate. A salt bath was placed around the flask and the bath was heated at 200–240° C. for 4 hours. A distillate weighing 7.8 parts by weight was obtained. This distillate was identified as acetic anhydride. The residue was a viscous silicone soluble in benzene. A film was poured on a glass plate. After the benzene evaporated, the remaining silicone film was heated for 6 hours at 110° C. A soft, tacky film was obtained.

The next example describes the formation of a silicone by the action of ethyl alcohol on butyl silicon triacetate.

*Example 2.*—A standard taper flask was fitted with a glass helices packed-column connected to an adjustable reflux ratio head. The flask was charged with 26.2 parts by weight of butyl silicon triacetate and 13.8 parts by weight of ethyl alcohol. The mixture was heated, under total reflux, at about 100° C. for 4 hours. A volatile mixture, consisting of ethyl alcohol and ethyl acetate, was removed by distillation. The residue remaining was a partially condensed silicone. Further condensation was affected by the addition of 13.8 parts by weight alcohol followed by an additional refluxing period of 5 hours. Another distillation produced more ethyl acetate. The silicone at this point was a colorless, syrupy liquid.

The next example describes the formation of a silicone by the action of silicon tetrachloride on butyl silicon triacetate.

*Example 3.*—In the same apparatus described in Example 2 was placed a mixture of 10 parts by weight of butyl silicon triacetate and 4.5 parts by weight of silicon tetrachloride. With a bath temperature of about 100° C., the mixture was heated for two hours. The apparatus was then connected to a water pump. Under the reduced pressure the mixture was heated for 3 hours with the salt bath being held at 220° C. A small amount of volatile material was drawn off under reduced pressure. The silicone, as the residue, was a viscous brown liquid.

The next example describes the formation of a silicone by the action of anhydrous ammonia on butyl silicon triacetate.

*Example 4.*—5 parts by weight of butyl silicon triacetate was placed in a tube. Ammonia, from a tank, was bubbled through mineral oil then through calcium chloride and, finally, it was passed into the butyl silicon triacetate. An immediate precipitation of acetamide occurred. The temperature increased to about 90° C. The passage of the ammonia was continued until the temperature had dropped to about 30° C. The viscous silicone liquid was decanted. The remaining acetamide was pressed between filter papers and weighed. The weight was found to be 3 parts by weight.

An ether solution of the silicone was made. A film was poured on a glass plate and the glass plate was heated at 120° C. for 4 hours. A clear, hard film was obtained.

The next example describes the formation of a silicone by the action of ammonia on butyl silicon triacetate in the presence of isopropyl ether.

*Example 5.*—The apparatus described in Example 4 was used. The reaction tube was charged with 5 parts by weight of butyl silicon triacetate and about 7.5 parts by weight of isopropyl ether. A cooling bath was placed around the reaction tube and ammonia was passed into the reaction mixture until there was no further precipitation of acetamide. The ether solution of the silicone was then filtered from the acetamide. When the ether was evaporated there remained a clear, viscous silicone liquid.

The next example describes the formation of a silicone by the action of ammonia on diethyl silicon dipropionate in the presence of isopropyl ether.

*Example 6.*—The apparatus described in Example 4 was used. The reaction tube was charged with 5 parts by weight of diethyl silicon dipropionate and about 7.5 parts by weight of isopropyl ether. The reaction tube was cooled with a water bath. Ammonia was passed into the mixture. The solid that immediately formed was removed at the end of the reaction and identified as propionamide. $2\frac{2}{10}$ parts by weight of propionamide was obtained. Evaporation of the ether left a residue of colorless, viscous silicone liquid.

The next example describes the formation of a silicone by the action of ammonia on butyl diacetoxy silane in the presence of benzene.

*Example 7.*—The apparatus described in Example 4 was used. The reaction tube was charged with 5 parts by weight of butyl diacetoxy silane and about 8.8 parts by weight of benzene. Ammonia was passed into the mixture until there was no further observable heat of reaction. The acetamide was removed by filtration. After evaporation of the benzene there remained a clear, viscous silicone liquid.

The next example describes the formation of a silicone by the action of water on butyl silicon triacetate.

*Example 8.*—2 volumes of water was added dropwise to 1 volume of butyl silicon triacetate. Considerable heat was generated and a white, gummy silicone precipitated. The water was removed from the silicone by filtration. An acetone solution of the silicone was made and from this solution a film was deposited on a glass plate. Heating the plate for 4 hours at 120° C. gave a clear, non-tacky film.

When 9 volumes of water were added to 1 volume of butyl silicon triacetate, a colloidal dispersion resulted. The mixture had a slight opaqueness due to the presence of some finely divided silicone particles. The addition of ammonium hydroxide to the dispersion caused the precipitation of a white, soft solid silicone which was partly soluble in common solvents.

The silicone was also obtained from the colloidal dispersion by extraction with benzene and by evaporation of the water in which the silicone was dispersed.

The next example describes the formation of a silicone by the action of water on ethyl silicon triacetate.

*Example 9.*—1 volume of ethyl silicon triacetate was added to 4 volumes of water. The mixture was vigorously shaken and as the product hydrolyzed to silicone and acetic acid most of the silicone became colloidally dispersed. The mixture developed some opaqueness due to the presence of some of the silicone in the form of very finely dispersed droplets. The silicone could be precipitated by the addition of ammonium hydroxide or by evaporation of part of the water in which it was dispersed. The silicone could also be obtained from the dispersion by extraction with a water-immiscible solvent like benzene.

The next example describes the formation of a silicone by the action of water on diethyl silicon diacetate.

*Example 10.*—1 volume of diethyl silicon diacetate was added to 7 volumes of water. The mixture was vigorously shaken and as the product hydrolyzed to silicone and acetic acid most of the silicone became colloidally dispersed. The mixture developed some opaqueness due to the presence of some of the silicone in the form of very finely dispersed droplets. The silicone could be precipitated by the addition of ammonium hydroxide or by evaporation of part of the water in which it was dispersed. The silicone could also be obtained from the dispersion by extraction with a water-immiscible solvent like benzene.

The next example describes the formation of a silicone by the action of water on n-propyl silicon triacetate.

*Example 11.*—1 volume of n-propyl silicon triacetate was added to 5 volumes of water. The mixture was vigorously shaken and as the product hydrolyzed to silicone and acetic acid most of the silicone became colloidally dispersed. The mixture developed some opaqueness due to the presence of some of the silicone in the form of very finely dispersed droplets. The silicone could be precipitated by the addition of ammonium hydroxide or by evaporation of part of the water in which it was dispersed. The silicone could also be obtained from the dispersion by extraction with a water-immiscible solvent like benzene.

The next example describes the formation of a silicone by the action of water on allyl silicon triacetate.

*Example 12.*—1 volume of allyl silicon triacetate was added to 9 volumes of water. The mixture was vigorously shaken and as the product hydrolyzed to silicone and acetic acid most of the silicone became colloidally dispersed. The mixture developed some opaqueness due to the presence of some of the silicone in the form of very finely dispersed droplets. The silicone could be precipitated by the addition of ammonium hydroxide or by evaporation of part of the water in which it was dispersed. The silicone could also be obtained from the dispersion by extraction with a water-immiscible solvent like benzene.

The next example describes the formation of a silicone by the action of water on di-n-butyl silicon diacetate.

*Example 13.*—1 volume of di-n-butyl silicon diacetate was added to 19 volumes of water. The mixture was vigorously shaken and as the product hydrolyzed to silicone and acetic acid most of the silicone became colloidally dispersed. The mixture developed some opaqueness due to the presence of some of the silicone in the form of very finely dispersed droplets. The silicone could be precipitated by the addition of ammonium hydroxide or by evaporation of part of the water in which it was dispersed. The silicone could also be obtained from the dispersion by extraction with a water-immiscible solvent like benzene.

The next example describes the formation of a silicone by the action of water on ethyl silicon tripropionate.

*Example 14.*—1 volume of ethyl silicon tripropionate was added to 5 volumes of water. The mixture was vigorously shaken and as the product hydrolyzed to silicone and propionic acid most of the silicone became colloidally dispersed. The mixture developed some opaqueness due to the presence of some of the silicone in the form of very finely dispersed droplets. The silicone could be precipitated by the addition of ammonium hydroxide or by evaporation of part of the water in which it was dispersed. The silicone could also be obtained from the dispersion by extraction with a water-immiscible solvent like benzene.

The next example describes the formation of a silicone by the action of water on diethyl silicon dipropionate.

*Example 15.*—1 volume of diethyl silicon dipropionate was added to 7 volumes of water. The mixture was vigorously shaken and as the product hydrolyzed to silicon and propionic acid most of the silicone became colloidally dispersed. The mixture developed some opaqueness due to the presence of some of the silicone in the form of very finely dispersed droplets. The silicone could be precipitated by the addition of ammonium hydroxide or by evaporation of part of the water in which it was dispersed. The silicone could also be obtained from the dispersion by extraction with a water-immiscible solvent like benzene.

The next example describes the formation of a silicone by the action of water on phenyl silicon triacetate.

*Example 16.*—1 part by weight of phenyl silicon triacetate was added to 4 parts by weight of water. The mixture was vigorously shaken and as the product hydrolyzed to silicone and acetic acid most of the silicone became colloidally dispersed. The mixture developed some opaqueness due to the presence of some of the silicone in the form of very finely dispersed droplets. The silicone could be precipitated by the addition of ammonium hydroxide or by evaporation of part of the water in which it was dispersed. The silicone could also be obtained from the dispersion by extraction with a water-immiscible solvent like benzene.

The next example describes the formation of a silicone by the action of water on hexyl silicon triacetate.

*Example 17.*—1 volume of hexyl silicon triacetate was added to 19 volumes of water. The mixture was vigorously shaken and as the product hydrolyzed to silicone and acetic acid most of the silicone became colloidally dispersed. The mixture developed some opaqueness due to the presence of some of the silicone in the form of very finely dispersed droplets. The silicone could be precipitated by the addition of ammonium hydroxide or by evaporation of part of the water in which it was dispersed. The silicone could also be obtained from the dispersion by extraction with a water-immiscible solvent like benzene.

The next example describes the formation of a silicone by the action of water on dimethyl silicon diacetate.

*Example 18.*—1 volume of dimethyl silicon diacetate was added to 6 volumes of water. The mixture was vigorously shaken and as the product hydrolyzed to silicone and acetic acid most of the silicone became colloidally dispersed. The mixture developed some opaqueness due to the presence of some of the silicone in the form of very finely dispersed droplets. The silicone could be precipitated by the addition of ammonium hydroxide or by evaporation of part of the water in which it was dispersed. The silicone could also be obtained from the dispersion by extraction with a water-immiscible solvent like benzene.

The next example describes the formation of a silicone by the action of water on butyl diacetoxy silane.

*Example 19.*—1 volume of butyl diacetoxysilane was added to 5 volumes of water. The mixture was vigorously shaken and as the product hydrolyzed to silicone and acetic acid most of the silicone became colloidally dispersed. The mixture developed some opaqueness due to the presence of some of the silicone in the form of very finely dispersed droplets. The silicone could be precipitated by the addition of ammonium hydroxide or by evaporation of part of the water in which it was dispersed. The silicone could also be obtained from the dispersion by extraction with a water-immiscible solvent like benzene.

The next example describes the formation of a silicone by the action of water on butyl dipropionoxy silane.

*Example 20.*—1 volume of butyl dipropionoxy silane was added to 6 volumes of water. The mixture was vigorously shaken and as the product hydrolyzed to silicone and propionic acid most of the silicone became colloidally dispersed. The mixture developed some opaqueness due to the presence of some of the silicone in the form of very finely dispersed droplets. The silicone could be precipitated by the addition of ammonium hydroxide or by evaporation of part of the water in which it was dispersed. The silicone could also be obtained from the dispersion by extraction with a water-immiscible solvent like benzene.

The next example relates to the copolymerization of butyl triacetoxy silane and methyl tributoxy silane.

*Example 21.*—$\frac{1}{10}$ mol $BuSi(OAc)_3$ was mixed with $\frac{2}{10}$ mol of $CH_3Si(OBu)_3$ in a distilling flask. The flask was heated with an oil bath at 180–190° C. About 20 cc. of a distillate was collected. The distillate, which was butyl acetate (B. Pt. 125° C.), contained no silicon materials.

A portion of the silicone was placed in a test tube and heated with an oil bath at 200° for 20 minutes. On cooling, the product separated in three fractions: (a) a slightly viscous, labile material, (b) a very viscous liquid, (c) a gel.

It may be noted that examples of copolymerization or condensation differ in their final products from the others. Whereas in the others the ultimate product is simply the completely condensed silicone, in these, in addition, new Si—O linkages are introduced.

Having thus set forth our invention, we claim:

1. The method of condensing silicon acylates which comprises heating in liquid condition a silicon acylate having 2 saturated fatty acid acyl radicals attached to silicon and having one hydrogen attached to silicon, the remaining radical attached to silicon being selected from the group consisting of alkyl, alkenyl and aryl radicals, with a silicone forming agent selected from the group consisting of water, anhydrous alcohol, anhydrous ammonia, and a silicon tetrahalide.

2. The method of making a silicone which comprises heating in liquid condition a silicon acylate having 2 saturated fatty acid acyl radicals attached to silicon and having one hydrogen attached to silicon, the remaining radical attached to silicon being selected from the group consisting of alkyl, alkenyl, and aryl radicals, until a silicone is formed.

3. The method of making a silicone as set forth in claim 1, in which the silicone forming agent is an anhydrous alcohol and the heating is carried out under refluxing conditions.

4. The method as set forth in claim 1, in which the silicone forming agent is a silicon tetrahalide.

5. The method of condensing silicon acylates which comprises treating in liquid condition a silicon acylate having 2 saturated fatty acid acyl radicals attached to silicon and having one hydrogen attached to silicon, the remaining radical attached to silicon being selected from the group consisting of alkyl, alkenyl and aryl radicals, with anhydrous ammonia, until a silicone is formed.

6. The method of condensing silicon acylates which comprises treating in liquid condition a silicon acylate having two saturated fatty acid acyl radicals attached to silicon and having one hydrogen attached to silicon, the remaining radical attached to silicon being selected from the group consisting of alkyl, alkenyl, and aryl radicals, with water until a silicone is formed, the volume ratio of acylate to water being from 1:2 to 1:19.

7. The method of condensing acylates which comprises treating in liquid condition with water until a silicone is formed, a silicon acylate having from 2 to 3 saturated fatty acid acyl radicals containing not more than six carbon atoms attached to silicon, there being not more than one hydrogen attached to silicon and not more than two acyl radicals present in said Si—H containing compound, any remaining radicals attached to silicon being selected from the group consisting of alkyl, alkenyl and aryl radicals, the ratio of water to acylate being from 5:1 by volume, to produce a colloidal solution of a hydrolyzed silicon acylate.

8. A solvolyzed silicon acylate, the acylate having two saturated fatty acid acyl radicals attached to silicon and having one hydrogen attached to silicon, the remaining radical attached to silicon being selected from the group consisting of alkyl, alkenyl and aryl radicals.

9. A colloidal solution of a solvolyzed silicon saturated fatty acid acylate having from 2 to 3 saturated fatty acid acyl radicals attached to silicon, there being not more than one hydrogen attached to silicon and not more than two acyl radicals present in said Si—H containing compound, any remaining radicals attached to silicon being selected from the group consisting of alkyl, alkenyl and aryl radicals, the acyl groups containing not more than six carbon atoms, the colloidal solution being produced by the method of claim 7.

10. The method of condensing silicon acylates which comprises treating in liquid condition with water until a silicone is formed, a silicon acylate having one fatty acid acyl group, two alkyl groups of from 1 to 4 carbon atoms and one hydrogen attached to silicon.

11. The method of condensing silicon acylates which comprises treating in liquid condition with water until a silicone is formed, a silicon acylate having one fatty acid acyl group, two alkyl groups of from 1 to 4 carbon atoms and one hydrogen attached to silicon, the concentration of reacted acylate being from 1 to 20% by weight in the resulting solution.

12. The method of condensing silicon acylates which comprises treating in liquid condition with water until a silicone is formed, a silicon acylate having one fatty acid acyl group, two alkyl groups of from 1 to 4 carbon atoms and one hydrogen attached to silicon, and recovering the silicon from the reaction products.

13. The product of a solvolyzed silicon acylate having a fatty acid acyl group, two alkyl groups of from 1 to 4 carbon atoms and one hydrogen attached to silicon.

14. An aqueous colloidal solution of the product of a solvolyzed silicon acylate having a fatty acid acyl group, two alkyl groups of from 1 to 4 carbon atoms and one hydrogen attached to silicon, the solution containing from 1 to 20% of a solvolyzed silicon saturated fatty acid acylate.

CHARLES A. MacKENZIE.
MILTON SCHOFFMAN.

REFERENCES CITED

The following references are of record in the file of this patent:

UNITED STATES PATENTS

| Number | Name | Date |
|---|---|---|
| 2,386,259 | Norton | Oct. 9, 1945 |
| 2,386,441 | Daudt | Oct. 9, 1945 |
| 2,389,802 | McGregor | Nov. 27, 1945 |
| 2,390,370 | Hyde | Dec. 4, 1945 |
| 2,397,287 | Ostberg | Mar. 26, 1946 |
| 2,405,988 | Barry | Aug. 20, 1946 |
| 2,412,470 | Norton | Dec. 10, 1946 |
| 2,441,422 | Krieble et al. | May 11, 1948 |
| 2,441,423 | Elliott et al. | May 11, 1948 |

OTHER REFERENCES

Kipping et al., Jour. Chem. Soc., vol. 79 (1901) pp. 449–459.